United States Patent

[11] 3,592,418

| | | |
|---|---|---|
| [72] | Inventor | Derek Wood<br>Sun Valley, Calif. |
| [21] | Appl. No. | 848,552 |
| [22] | Filed | Aug. 8, 1969 |
| [45] | Patented | July 13, 1971 |
| [73] | Assignee | Bell Aerospace Corporation |

[54] AIRCRAFT STABILITY CONTROL SYSTEM
6 Claims, 1 Drawing Fig.

[52] U.S. Cl. ................................................. 244/85
[51] Int. Cl. ................................................. B64c 13/40
[50] Field of Search .......................................... 244/83, 84, 76—78, 77 M, 90, 75; 91/363, 413

[56] References Cited
UNITED STATES PATENTS

| 2,949,258 | 8/1960 | Bell .............................. | 244/77 M |
| 3,368,351 | 2/1968 | Wood et al. .................. | 244/84 (X) |

Primary Examiner—Milton Buchler
Assistant Examiner—Carl A. Rutledge
Attorney—Nilsson and Robbins ABSTRACT: An aircraft control system utilizing redundant major control surfaces which are mechanically under pilot control and redundant minor control surfaces for stabilizing the aircraft and which are responsive to automatically generated stabilizing signals.

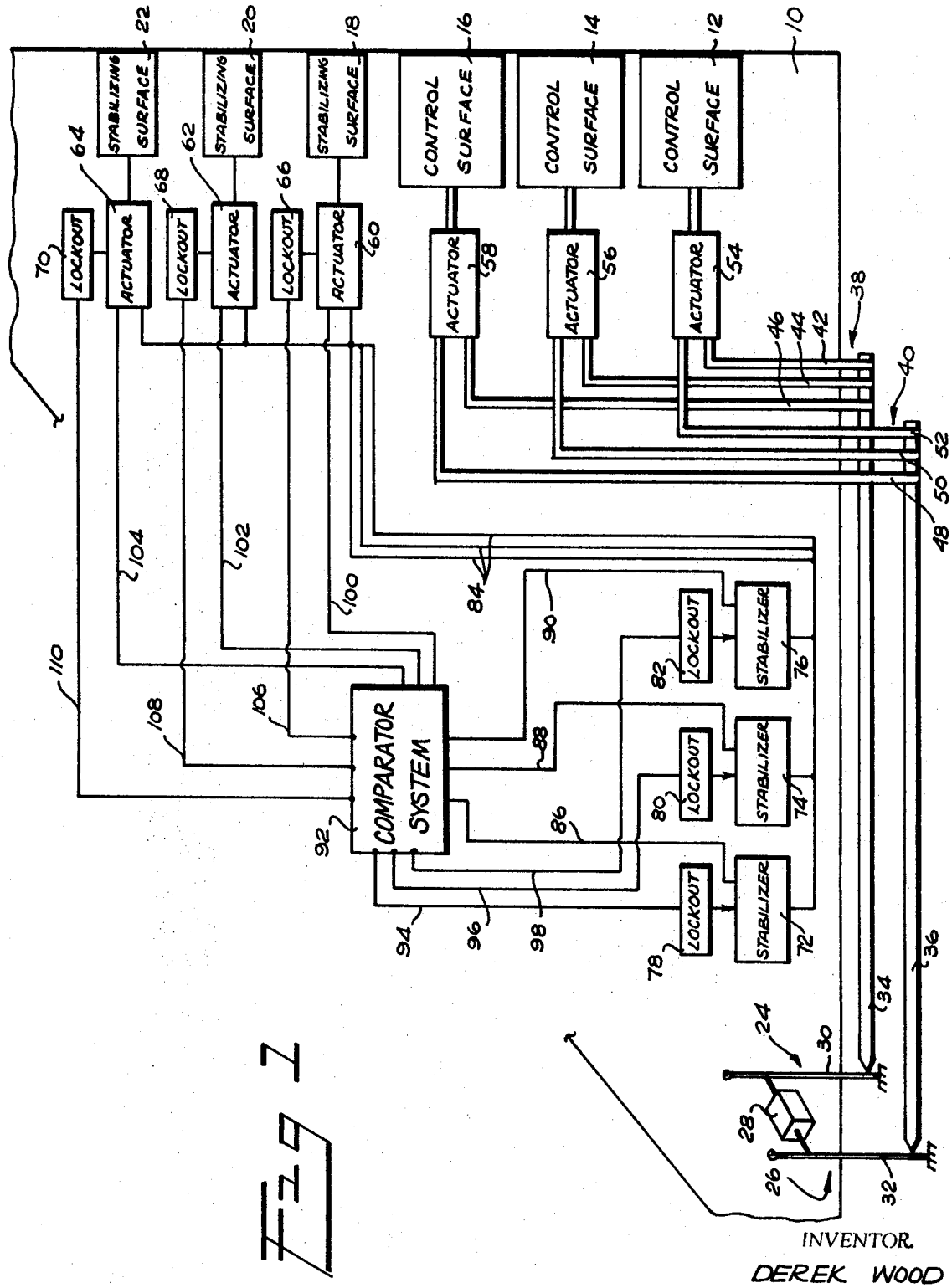

3,592,418

1

AIRCRAFT STABILITY CONTROL SYSTEM

BACKGROUND OF THE INVENTION

1. Field of the Invention

The field of art to which the invention pertains includes the field of control systems and more particularly the field of redundant hydraeric-mechanical control systems.

2. Description of the Prior Art

The term "hydraeric" as used throughout the specification and claims is intended to be generic to fluid under pressure and includes both hydraulics and pneumatics.

It has been generally considered that operation of modern aircraft requires the utilization of power and automatic flight control. However, such power assists that result in a "fly-by-wire" mode of operation are often viewed with distrust by pilots who are reluctant to relinquish direct control of the aircraft. Redundancy systems have been developed to reduce the possibility of component failure, and manual override systems have been devised, however, the pilot must still depend on the reliability of electronic and/or hydraeric equipment for major control of the flight. Further, present generation high-speed aircraft are often inherently unstable and means must be provided to rapidly adjust sufficient aerodynamically reacting surface to compensate for small but destabilizing changes in flight conditions. Prior systems which provide power assist for major flight path control utilize the same large control surfaces and actuators to effect stability control, resulting in requirements of high stiffness in the large surfaces, increasing their structural weight, and large power consumption for moving the large surfaces in rapid response to stabilizing signals.

SUMMARY OF THE INVENTION

The present invention provides an aircraft control system in which the aerodynamic instability of the aircraft is automatically and efficiently compensated, yet the major control surfaces which control the flight path of the aircraft are under direct manual control of the pilot. The present invention does not contravene the current practice of "fly-by-mechanical rods" since the pilot has continuous override control, but the aircraft is more aerodynamically efficient.

Specifically, the aircraft control system herein comprises: a plurality of major control surfaces for controlling the flight path of the aircraft; means for pilot control of the major control surfaces; a plurality of minor control surfaces for stabilizing the aircraft in flight; means for sensing instability of the aircraft and generating a stabilizing signal; a redundant plurality of control members responsive to the stabilizing signal for moving a minor control surface to thereby stabilize the aircraft; and means for determining nonconformity of any of the redundant control members whereby to selectively disable a nonconforming member. The instability sensing means are also provided in redundant form with means for selectively disabling a nonconforming member.

The minor surfaces are controlled by hydraeric servomechanisms which can be made small and fast-acting so as to accurately respond to high frequency stability signals, but the mechanical system does not have to be fast acting; current rigging procedures are therefor acceptable. Structural weight can be saved because high stiffness is required only for the minor control surfaces. The aircraft can be made more maneuverable by utilization of the present invention and considerable power is saved because the large surface units are not required to have a wide band-pass capability.

BRIEF DESCRIPTION OF THE DRAWING

The single FIGURE is a diagrammatic representation of a control system for an aircraft wing constructed in accordance with the present invention.

DETAILED DESCRIPTION

In the illustrative system diagrammatically depicted in the drawing, an aircraft wing 10 is provided with a plurality of major control surfaces 12, 14 and 16 and a plurality of minor stabilizing surfaces 18, 20 and 22. The major surfaces 12, 14 and 16 are movable members, the control of which effects large changes in the aerodynamic response of the aircraft wing 10. Control information for the major control surfaces 12, 14 and 16 is provided by physical displacement of manual controls 24 and 26. The manual controls 24 and 26 are interconnected by a disengageable lock mechanism 28 and constitute dual controls (for pilot and copilot), each including a pivotally mounted lever 30 and 32, whereby manual movement of either of the levers 30 or 32 produces a similar movement of the other lever.

The levers 30 and 32 are connected through elongated control cables 34 and 36, respectively, to mechanical linkage networks 38 and 40, respectively. Each linkage network includes three branches 42, 44, 46 and 48, 50, 52 and each branch transmits the mechanical input signal to one of three control surface actuators 54, 56 and 58, in such manner that each control cable 34 and 36 transmits the mechanical input signal, via its linkage network 38 and 40 to each of the actuators 54, 56 and 58. The actuators 54, 56 and 58 are operatively connected to the control surfaces 12, 14 and 16, respectively, so as to mechanically effect movement of the control surfaces. In the particular system illustrated herein, all three branches in each linkage network 38 and 40 are simultaneously operative to effect three channel redundant control for each control cable 34 and 36, while the dual manual controls 24 and 26 provide two channel cable redundancy. Alternatively, the system can operate with only two branches in each linkage network 38 and 40 simultaneously operative whereby one branch operates on a standby basis, or a larger number than three branches may be utilized and all functioning at all times, or one or more may be standby in nature, the number of operative channels in each control chain depending on the system needs and specifications, all as known to the prior art.

The foregoing major control system effects redundant manual control by the pilot of the flight path of the aircraft, but does not effect automatic stability control. The inherent instability of many modern aircraft requires rapid response to destabilizing conditions for satisfactory operation. In the present system, stability control is effected by providing separate, relatively small stabilizing surfaces 18, 20 and 22, which surfaces are not under manual control of the pilot, but respond automatically to signals developed by automatic stabilizers. Specifically, a redundant plurality of lightweight stabilizing surfaces 18, 20 and 22 of relatively high natural frequency or "stiffness" is provided. Each stabilizing surface has operatively associated therewith an actuator 60, 62 and 64, respectively, and each actuator has operatively associated therewith a lockout mechanism 66, 68 and 70, respectively, which effects disabling of a failed actuator. The actuators are hydraeric servomechanisms, but in the broader concept herein any prior art actuator can be utilized.

The actuators respond to signals generated by a redundant plurality of stabilizers, in this system three stabilizers 72, 74 and 76. Lockout members 78, 80 and 82 are associated with the stabilizers and serve to disable a failed stabilizer. Each stabilizer can include a gyroscope and associated instrumentation to generate a signal, which signal is generated hydraerically and transmitted over the hydraeric lines 84 to the actuators to effect an appropriate movement of the stabilizing surfaces 18, 20 and 22 to thereby stabilize the aircraft. Alternatively, the stabilizers can generate an electrical signal to appropriate actuators, and in such case the lines 84 would be electrically conducting lines.

Redundant actuators and stabilizers are provided so as to provide the stabilizing function with a high degree of reliability. Safety is increased by the fact that control of the major movable surfaces 12, 14 and 16 is effected manually and these surfaces 12, 14 and 16 are sufficiently gross in comparison to the stabilizing surfaces 18, 20 and 22 as to enable complete override of the stabilizing system. Accordingly, in the unlikely event that all three stabilizing channels should fail the pilot could still exercise direct flight control. Thus, while the format of this invention provides "stability-by-wire," it does not suffer the drawbacks of full "fly-by-wire" operation.

Considering further the redundancy of the system, and initially with respect to the signals generated by the redundant plurality of stabilizers 72, 74 and 76, signals which are identical to those generated over the lines 84 are generated over the lines 86, 88, and 90, respectively, to a comparator system 92. The comparator system 92 determines nonconformity of any of the signals and in the event of such nonconformity generates a disabling signal over the line 94, 96 or 98 to the lockout mechanism 78, 80 or 82 associated with the stabilizer which is generating the nonconforming signal. The lockout mechanism 78, 80 or 82 which receives the disabling signal operates to disconnect the signal generating instrumentation from the nonconforming stabilizers and the actuators 60, 62 and 64 are then responsive only to the signals generated by the remaining stabilizers. Comparison may be made among all the redundant members to sense disparity between the members, or comparison may be made with predetermined signal limits stored in the comparator, all as known to the prior art. In the subsequent event of a disparity in the signals generated by the remaining stabilizers, the comparator can effect a signal to lockout both remaining stabilizers and control would then vest entirely in the pilot. Alternatively, the system may be designed to lockout only the faulty stabilizer. In any event, appropriate signals are supplied to the pilot control panel so that he is apprised of the condition of the stabilizing mechanism.

In a similar manner, movements of the actuators 60, 62 and 64 are monitored by the comparator system 92 by feedback monitor signals from the actuators to the comparator system 92 over the lines 100, 102 and 104, respectively. The comparator system 92 determines nonconformity of any of the actuators as manifest in the monitor signal and then generates a signal to the lockout mechanism 66, 68 or 70 associated with the nonconforming actuator, over the line 106, 108 or 110 respectively, to lock the nonconforming actuator in a neutral position. The system is designed so that the stabilizing control surfaces controlled by the remaining actuators are together capable of controlling stability of the aircraft. In the subsequent event of failure of another actuator, the disparity in the remaining monitor signals would be sensed by the comparator system and both actuators would be locked out. Alternatively, the comparator system 92 can compare the monitor signals with predetermined signal limits to lock out only the faulty actuator. An appropriate signal of the condition of the actuators would be indicated on the pilot control panel and the pilot can assume control if necessary. In the latter case, a single stability control surface should be capable of effecting stability control.

Although the foregoing description was specifically directed to control surfaces such as the control flaps of an airplane wing, it will be understood that the principles described herein are fully applicable to the stabilization of aircraft in which the control surfaces are located on other than a wing structure. For example, the concepts described herein are applicable to control surfaces which constitute the blades of a helicopter lifting rotor. Those surfaces which have been referred to as major control surfaces can constitute major helicopter rotor blades, and those surfaces which have been referred to as minor control surfaces can constitute auxiliary stabilizing blades on the helicopter rotor.

The comparator system 92 employs apparatus and procedures known to the art and the manner of its operation will be understood by those skilled in the art. There have also been disclosed in schematic form other devices and control apparatus, the manner and function of which are well known to the art. On the other hand, certain aspects of a control system in accordance with the present invention have been illustrated in some detail and such is to be taken as an example of an operative system and is not to be taken as a limitation upon the scope of the claims appended hereto.

What I claim is:

1. An aircraft control system comprising:
    a plurality of major control surfaces for controlling the flight path of said aircraft;
    means for pilot control of said major control surfaces;
    a plurality of minor control surfaces for stabilizing said aircraft in flight;
    a redundant plurality of means for sensing instability of said aircraft, each generating a stabilizing signal;
    a redundant plurality of control members, each receiving a stabilizing signal from one of said instability sensing means and being responsive to said received stabilizing signal for moving one of said minor control surfaces to thereby stabilize said aircraft; and
    comparator means connected to said control members for determining nonconformity of any of said redundant control members whereby to selectively disable a nonconforming member.

2. The control system of claim 1 wherein disabling of a single nonconforming minor control member leaves sufficient minor control surface under stabilizer control to stabilize said aircraft.

3. The control system of claim 1 wherein said pilot control means comprises means for direct manual control by said pilot of said major control surfaces.

4. The control system of claim 1 including means for determining conformity of any one of the signals from said plurality of instability sensing means whereby to selectively disable a nonconforming means.

5. The control system of claim 1 wherein said plurality of major control surfaces are interconnected for redundant major control.

6. The control system of claim 1 wherein said major and minor control surfaces comprise control portions of a split wing surface.